United States

Jernigan

[11] 3,821,548
[45] June 28, 1974

[54] INVERTED TIME IMPULSED BRAGG ANGLE MATCHED FILTER

[75] Inventor: James L. Jernigan, Inyokern, Calif.

[73] Assignee: The United States of America as represented by the Secretary of the Navy, Washington, D.C.

[22] Filed: July 10, 1972

[21] Appl. No.: 270,366

Related U.S. Application Data

[63] Continuation-in-part of Ser. No. 763,054, Sept. 25, 1968, abandoned.

[52] U.S. Cl. ............... 250/216, 235/181, 350/161
[51] Int. Cl. .............................................. H01j 3/14
[58] Field of Search ..... 250/216; 235/181; 329/141; 350/161, 162 SF, 35

[56] References Cited
UNITED STATES PATENTS

| | | | |
|---|---|---|---|
| 3,189,746 | 6/1965 | Slobodin | 235/181 |
| 3,432,647 | 3/1969 | Wilmotte | 235/181 |
| 3,441,724 | 4/1969 | Taylor | 235/181 |
| 3,483,386 | 12/1969 | Jernigan | 250/216 |
| 3,488,438 | 1/1970 | Korpel | 350/161 |
| 3,544,795 | 12/1970 | Korpel | 350/161 |

Primary Examiner—James W. Lawrence
Assistant Examiner—D. C. Nelms
Attorney, Agent, or Firm—R. S. Sciascia

[57] ABSTRACT

A means for encoding and decoding electrical signals using monochromatic spatially coherent light by impulsing a Bragg Angle matched filter in such a manner that the output light beam and electrical signals will be in the correct order for correlation.

11 Claims, 3 Drawing Figures

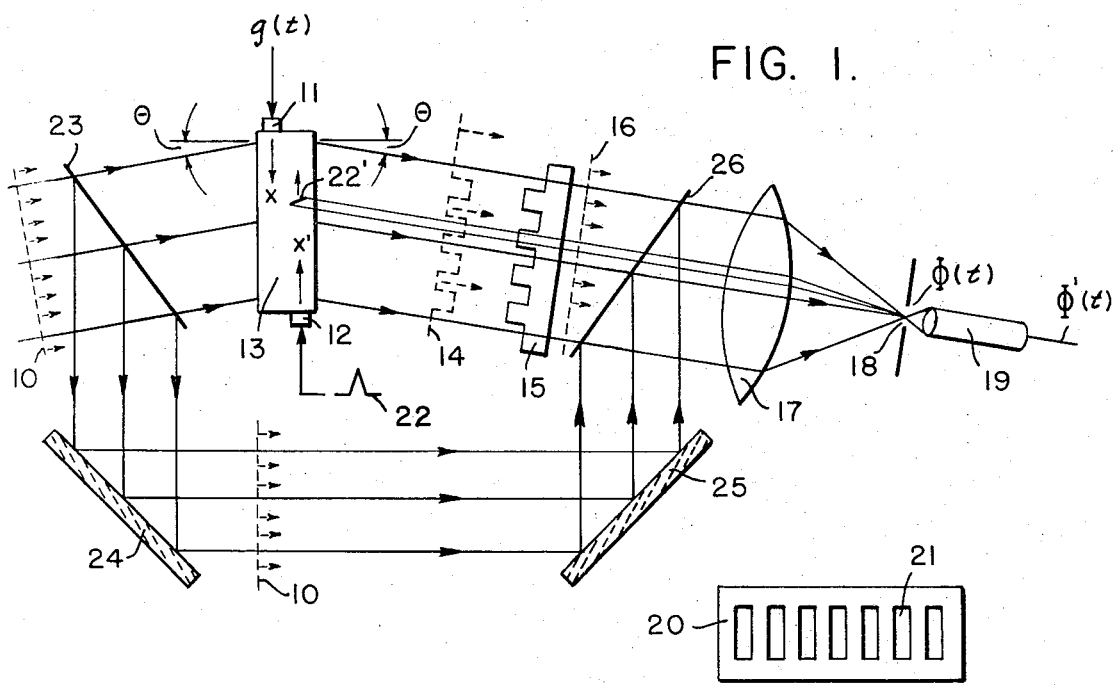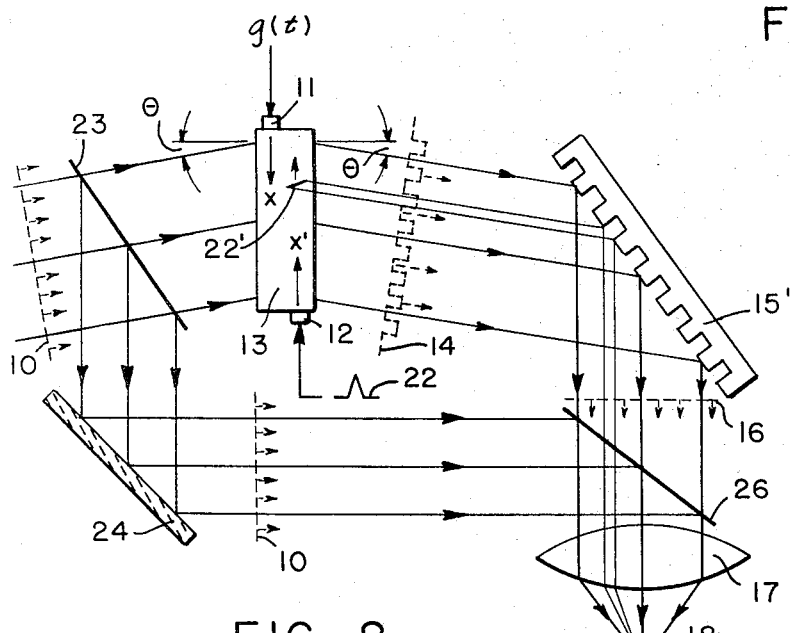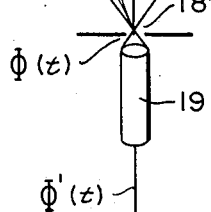

INVERTED TIME IMPULSED BRAGG ANGLE MATCHED FILTER

The present application is a continuation-in-part of U.S. Pat. application Ser. No. 763,054 filed Sept. 25, 1968, now abandoned.

BACKGROUND OF THE INVENTION

The present invention relates to a matched filter system and more particularly to a system which uses the Bragg Law to achieve light modulation.

One such system is the Bragg Angle Matched Filter disclosed in U.S. Pat. No. 3,483,386 by James L. Jernigan. In that system, separate code generating means were required to encode the monochromatic spatially coherent light as it passed through an ultrasonic delay cell.

SUMMARY OF THE INVENTION

In accordance with the present invention, means are provided for producing and recognizing coded pulses by introducing an impulse into the Bragg Angle Matched Filter system to read out the code for which the system is matched. This is analogous to impulsing a matched filter as treated in passive network theory.

Monochromatic spatially coherent light is directed onto an ultrasonic delay cell at an angle equal to that which satisfies the Bragg Law for the desired frequency. The delay cell modulates the incident light causing a coded wave-front to emerge from it. The coded wave front impinges in turn upon a wave plate designed to transform into a plane wave front only a wave front corresponding to the phase code placed on said wave plate. The plane wave and a reference beam previously split from the original light are focused by a lens where it is detected by a photodetector located behind a pin hole aperture where the waves interact in a heterodyning fashion.

The present invention operates as follows: Monochromatic spatially coherent light, intercepted by a beam splitter, is both reflected to a mirror and transmitted to a delay cell. An electrical impulse is fed into the delay cell, thereby altering the frequency of the exiting diffracted light beam. The diffracted light beam is transmitted through a wave plate which changes the diffracted beam into a plane modulated wave front. The wave front is combined in a second beam splitter with the reflected beam from the first beam splitter. The combined light is focused and detected by a photodetector whereat heterodyning occurs, resulting in a coded modulated output.

The encoded output is then fed into an environment determined by the chosen application for the invention, which application can be in a radar system. Regardless of the application, the environment will include extraneous and, possibly, jamming signals.

A second input to the delay cell is included for coupling signals of interest into the system, which signals are those residing in the chosen environment and include the encoded output. The signal of interest is fed into the delay cell after each electrical impulse and before the next. Thereby, the delay cell is used alternately to encode and decode.

When the signal of interest is the returning encoded output, which matches the code of the system, the transmitted light correlates with the wave plate and a compressed pulse occurs and is detected. The photodetector then provides an output in response to the decoded signal, which output is the system output.

When the signal of interest is any other signal, the transmitted light does not correlate with the wave plate and no output is provided.

To reiterate, first an electrical impulse is fed into the delay cell and, in response thereto, an encoded electrical output is provided by the photodetector. Second, and before the next such electrical impulse is fed into the delay cell, the encoded output is fed into an uncontrolled environment, and then, possibly returned to a second delay cell input along with all other signals found in that environment. Third, and still before the next encoding electrical impulse is fed into the delay cell, the system discriminates between signals fed into the second input that match the code of the system and those that do not; and, the photodetector provides the system output in response to the code matching signals.

The present invention, therefore, both produces a coded pulse and recognizes a coded pulse that matches the code of the system.

The general purpose of this invention is to provide a matched optical filter system which can be used for encoding and decoding at frequencies above 200 megacycles and which will have a broad bandwidth exceeding 20 megacycles. The 200 megacycle capability stems from the high carrier frequency necessary to produce efficient Bragg diffraction.

BRIEF DESCRIPTION OF THE DRAWINGS

FIG. 1 is a schematic, partially in block diagram from, of a preferred embodiment of the invention;

FIG. 2 is a schematic of an alternate embodiment of the invention utilizing a reflective wave plate; and FIG. 3 is a detailed plan view of the mask used to make deposits on the wave plate.

DESCRIPTION OF THE PREFERRED EMBODIMENTS

As shown in FIGS. 1 and 2, monochromatic spatially coherent light 10 impinges upon double ended ultrasonic delay cell 13 at the Bragg Angle $\theta$.

An electrical impulse 22 is impressed upon piezoelectric transducer 12 generating acoustic impulse 22' which causes a small portion of incident light 10 to be diffracted at the Bragg Angle which is satisfied by the relation $$n\lambda = 2\Omega \sin \theta$$

where:

$n$ = the order of diffraction
  $\lambda$ = wavelength of the monochromatic spatially coherent light source
  $\Omega$ = ultrasonic wavelength of the center frequency of the impulse
  $\theta$ = angle of incidence of the monochromatic spatially coherent light source to the direction of ultrasonic velocity $x$ or $x'$.

The optical frequency of this small beam of diffracted light is changed by a small amount $f_1$ due to the doppler effect caused by the moving acoustic waves within delay cell 13.

Before light 10 arrives at delay cell 13 beam splitter 23 splits off part of incident monochromatic spatially coherent light 10 and directs it onto full reflective mirror 24.

As shown in FIG. 1, mirror 24 directs incident beam 10 onto a second mirror 25 which applies the beam to beam splitter 26. Beam splitter 26 combines wave front 16 with incident wave front 10.

As shown in FIG. 2, mirror 24 directs incident beam 10 onto beam splitter 26 which combines incident beam 10 with wave front 16.

If $f_o$ represents the center frequency of incident plane wave front 10, a new frequency $f_o - f_1$ is caused by the doppler shift in the frequency of the portion of the beam diffracted by ultrasonic impulse 22' moving in direction $x'$. The value of $f_1$ is determined by the angle $\theta$ and the velocity of inpulse 22.

The phase modulating electrical signal $g(t)$ as generated by photodetector 19 may now be returned to transducer 11 for detection purposes. If such a phase modulating signal is impressed upon transducer 11, the light wave emerging from delay cell 13 is modulated by $g(t)$ yielding the spatial function $g(\tau - x)$ where $\tau = t/v$ and
where
 $v$ = velocity of sound in the delay cell
 $\tau$ = delay interval in time and space of delay cell 13 due to the velocity of the acoustic wave and
 $x$ = direction of travel of the acoustic waves in delay cell 13.

Light wave 14 then impinges upon quartz wave plate 15 as shown in FIG. 1.

Quartz wave plate 15 may be constructed by depositing silicon dioxide through a mask 20 onto a plate as illustrated in FIG. 3. The spacing between slots 21 is chosen to generate a desirable code when impulsed. The deposit, therefore, creates a coded relief of varying optical thickness with respect to the impinging beam from ultrasonic impulse 22'.

As coded wave front 14 impinges upon coded wave plate 15, the varying optical path length of wave plate 15 changes the phase of light travelling out of the coded wave plate so that phase modulated wave front 14 emerges from the wave plate as a plane wave 16. This phenomena will occur only when a wave front impressed with a proper code impinges upon wave plate 15. If an improperly coded wave front impinges upon the wave plate, a plane wave will not result.

Plane wave front 16 emerging from wave plate 15 is focused by a lens 17 through diffraction limited aperture 18 behind which a photodetector 19, such as a photocell, indicates the presence or absence of incident plane waves. It should be noted that only a plane wave can be focused to pass through this aperture, a wave front containing some modulation will not properly focus, and therefore will not be detected.

In operation, the small beam of Bragg diffracted light exits from delay cell 13 and scans across wave plate 15 as shown in FIG. 1 producing a time varying phase on the wave passing through condensor 17 to pin hole 18 and into photodetector 19.

An alternate embodiment as shown in FIG. 2 uses an aluminum reflector 15' with aluminum deposited through the mask shown in FIG. 3 to act as the wave plate. The spatial code on the wave plate causes each ray of impinging light to travel a different distance. Thus, the phase modulation impressed on wave front 14 is detected, and a plane wave front 16 emerges which is focused by lens 17 onto aperture 18 and photodetector 19. In the alternate embodiment, the small beam of Bragg diffracted light exits from delay cell 13 and scans across aluminum reflector 15'.

Consider first the case where no phase modulating signal $g(t)$ is impressed upon ultrasonic transducer 11.

The small beam of light exiting from the wave plate 15 or reflecting off reflector 15' enters photodetector 19 via aperture 18 where it is mixed with incident light beam 10 containing optical frequency $f_o$. Photodetector 19 operates on the principle of square law detection to detect $f_o$ and $(f_o - f_1)$. The output of photodetector 19, $\phi'(t)$, is thus $f_1$ modulated by the phase changes caused by the small beam scanning across wave plate 15 or aluminum reflector 15'.

Because the code is scanned backwards across wave plate 15 or aluminum reflector 15', the output of the photodetector 19 contains the pulse response of the matched filter in inverted time. The output signal of the photodetector $\phi'(t)$ may be returned to transducer 11 at some future time, such as by a radar system which transmits the output signal $\phi'(t)$ and feeds the return from the target to transducer 11, so that the matching properties of the system for the generated signal may be examined.

As described above, the generated pulse entering transducer 11 will fill delay cell 13 completely producing a phase modulated wave front which will match the code placed on wave plate 15 or aluminum reflector 15'.

The generated pulse also satisfies the Bragg relation and will yield a doppler shifted frequency $f_o + f_1$ where $f_o$ = frequency of the incident light; and
 $f_1$ = change in frequency due to the doppler shift.

Wave front 16 and incident wave front 10 are combined by beam combining mirror 26. The two optical beams when mixed by photodetector 19, produce a wave having the phase code of the wave plate superposed on carrier frequency $f_1$.

The optical transfer function of wave plate 15, or aluminum reflector 15' may be denoted as $f(x)$ where
 $f(x) = e^{i \phi(x)}$ and
 $\phi(x) = $ is the phase modulating factor in $x$.

The diffracted beam resulting from impulse 22 will cause photodetector 19 to generate an output function represented by
 $g(t) = \phi'(t) = A_o e^{i[2\pi f_1 t + \phi(t)]}$
where $\phi'(t)$ is now the impulse response of the filter in reverse time.

$A_o$ represents the amplitude of the output signal.

Whenever $g(t)$ is returned to transducer 11 and fills the delay cell, an optical wave represented by
 $g(\tau - x) = A_o e^{i[2\pi(f_1 + f_2)(\tau - x) + \phi(\tau - x)]}$
impinges onto wave plate 15 or aluminum reflector 15'.

The wave exiting from wave plate 15 or reflecting off aluminum reflector 15' may be represented by
 $g'(\tau - x) = f(x)g(\tau - x)$.

This wave is integrated onto aperture 18 by condensor 17 where it is detected by photodetector 19. The light falling onto the photodetector may be rrpresented by $$\phi(\tau) = \int_0^x f(x)g(\tau - x)dx$$

where the integral is taken over the diameter of condensing lens 17.

The function $\phi(\tau)$ is mixed with the reference wave of frequency $f_0$ and square law detected yielding an output function from photodetector 19 approximated by $$\phi(\tau) = A_0 \int_0^x e^{i[2\pi f_1 \tau + \phi(\tau - x) + \phi(x)]} dx$$

which represented the desired function.

If the carrier frequency $f_1$ is envelope detected, a function of the form $$\phi'(\tau) = A_0 \int_0^x e^{i[\phi(\tau - x) + \phi(x)]} dx$$

results.

It is well known that holographic techniques permit placing of a code such as the code impressed upon wave plate 15 upon a holographic plate. Thus, it is within the scope of this disclosure to detect phase modulated wave front, such as wave front 14, by the use of a hologram. It is also well known that holographic techniques permit superimposition of several different codes placed at various angles with respect to an incident beam of light. Thus, it is also within the scope of this disclosure to detect several different codes employing a plurality of photodetectors placed at the various angles as required by the hologram pattern.

What is claimed is:

1. A matched filter system for recognizing a coded pulse of a given character comprising:
    a source of monochromatic spatially coherent light rays;
    means for modulating said light rays in response to a first modulating signal;
    means for modulating said light rays in response to a second modulating signal;
    a wave plate to intercept the coded modulated wave;
    means for combining the monochromatic spatially coherent light rays with the intercepted coded modulated wave; and
    a lens to focus the combined wave fronts onto a photodetector.

2. A matched filter system as described in claim 1 wherein:
    said modulating means comprises an ultrasonic delay cell having first and second piezoelectric transducers; and
    the modulation is phase modulation.

3. A matched filter system as described in claim 2 wherein:
    said delay cell is positioned so that said light rays impinge upon the delay cell at the Bragg Angle.

4. A matched filter system as described in claim 3 wherein:
    said delay cell is positioned so that said light rays impinge upon the delay cell at the angle $\theta$, where $\theta$ is satisfied by equation
    $n\lambda = 2\Omega \sin \theta$
    where
    $n$ = the order of diffraction
    $\lambda$ = wavelength of the monochromatic spatially coherent light source
    $\Omega$ = ultrasonic wavelength
    $\theta$ = angle of incidence of the monochromatic spatially coherent light to the direction of the ultrasonic velocity.

5. A matched filter system as described in claim 4 wherein:
    a first modulating signal is applied to said first means for modulating said light rays;
    an impulse is applied to said second means for modulating said light rays; so that
    the output of said photodetector effectively impulses the filter with a reversed time read out.

6. A matched filter system as described in claim 5 wherein:
    the first modulating signal is the output of the photodetector.

7. A matched filter system as described in claim 5 wherein said wave plate consists of sodium dioxide deposited through a mask upon a quartz face to create a relief on the surface such that the phase delay due to the varying optical thickness will compensate the phase modulated code and produce a plane wave output.

8. A matched filter system as described in claim 5 wherein said wave plate consists of aluminum deposited through a mask upon an aluminum reflector to create a relief on the surface such that the phase delay due to the varying optical thickness will compensate the phase modulated code and produce a plane wave output.

9. A matched filter system as described in claim 5 wherein said wave plate consists of a hologram.

10. A matched filter system as described in claim 5 wherein said photodetector has an aperture comprised of a diffraction limited pin hole.

11. A matched filter system as described in claim 10 wherein the means for combining the monochromatic spatially coherent light rays with the detected coded modulated wave comprises:
    a first semitransparent mirror to split the monochromatic spatially coherent light into two beams;
    the first beam impinges upon the ultrasonic delay cell, and
    the second beam impinges upon a first fully reflective mirror;
    a second fully reflective mirror to reflect the second beam reflected from said first fully reflective mirror onto a second semitransparent mirror; and
    a second semitransparent mirror to combine the second beam with the detected coded modulated wave.

* * * * *